(12) United States Patent
Ishikawa et al.

(10) Patent No.: US 8,923,658 B2
(45) Date of Patent: Dec. 30, 2014

(54) OPTICAL WAVEGUIDE DEVICE

(75) Inventors: Yasuhiro Ishikawa, Chiyoda-ku (JP);
Katsutoshi Kondou, Chiyoda-ku (JP);
Norikazu Miyazaki, Chiyoda-ku (JP);
Satoshi Oikawa, Chiyoda-ku (JP)

(73) Assignee: Sumitomo Osaka Cement Co., Ltd.,
Chiyoda-ku, Tokyo (JP)

( * ) Notice: Subject to any disclaimer, the term of this patent is extended or adjusted under 35 U.S.C. 154(b) by 215 days.

(21) Appl. No.: 13/583,593

(22) PCT Filed: Mar. 9, 2011

(86) PCT No.: PCT/JP2011/055458
§ 371 (c)(1),
(2), (4) Date: Oct. 17, 2012

(87) PCT Pub. No.: WO2011/111726
PCT Pub. Date: Sep. 15, 2011

(65) Prior Publication Data
US 2013/0064492 A1    Mar. 14, 2013

(30) Foreign Application Priority Data
Mar. 10, 2010    (JP) ................. 2010-052516

(51) Int. Cl.
*G02F 1/035* (2006.01)
*G02B 6/293* (2006.01)
*G02B 6/12* (2006.01)
*G02B 6/122* (2006.01)
*G02F 1/01* (2006.01)
*G02F 1/21* (2006.01)

(52) U.S. Cl.
CPC ........ *G02B 6/29352* (2013.01); *G02B 6/12007* (2013.01); *G02B 6/122* (2013.01); *G02B 6/29355* (2013.01); *G02F 2001/212* (2013.01); *G02F 2001/217* (2013.01); *G02F 2201/05* (2013.01); *G02F 2201/06* (2013.01); *G02F 2202/20* (2013.01)
USPC ........................................ 385/3; 385/1; 385/2

(58) Field of Classification Search
CPC ............ G02B 6/2935; G02B 6/29352; G02B 6/29355
See application file for complete search history.

(56) References Cited

U.S. PATENT DOCUMENTS 5,195,162 A * 3/1993 Sultan et al. .................. 385/130
5,224,193 A * 6/1993 Risk .............................. 385/122
(Continued)

FOREIGN PATENT DOCUMENTS

JP    6-503902 A    4/1994
JP    8-179168 A    7/1996
(Continued)

OTHER PUBLICATIONS

Nishihara, H., et al., Optical Integrated Circuit, 3rd impression of revised and enlarged edition, Ohmsha, Ltd., Japan, Mar. 25, 1998, pp. 45-47.
(Continued)

*Primary Examiner* — Rhonda Peace
(74) *Attorney, Agent, or Firm* — Taft Stettinius & Hollister LLP (57) ABSTRACT

An optical waveguide device having a Mach-Zehnder type waveguide formed on a substrate is provided in which a slope of two waveguides input to an optical coupler on an output side of the Mach-Zehnder type waveguide is 0 degrees, a waveguide of the optical coupler after being coupled by the optical coupler is a multi-mode waveguide, and the waveguide which is output from the optical coupler is a three-branched waveguide including an output main waveguide and two output sub waveguides interposing the output main waveguide therebetween.

7 Claims, 5 Drawing Sheets

(56) References Cited

U.S. PATENT DOCUMENTS

| | | | |
|---|---|---|---|
| 5,410,625 A | 4/1995 | Jenkins et al. | |
| 5,627,929 A | 5/1997 | Vawter et al. | |
| 7,200,289 B2* | 4/2007 | Yamada et al. | 385/3 |
| 7,359,581 B2* | 4/2008 | Miyazaki et al. | 385/3 |
| 7,444,039 B2* | 10/2008 | Kondou et al. | 385/2 |
| 7,532,778 B2* | 5/2009 | Yamada et al. | 385/3 |
| 2008/0002926 A1 | 1/2008 | Kondou et al. | |
| 2011/0194802 A1* | 8/2011 | Sugiyama et al. | 385/3 |
| 2012/0027337 A1* | 2/2012 | Kondou et al. | 385/3 |
| 2012/0207425 A1* | 8/2012 | Kondou | 385/2 |
| 2013/0064492 A1* | 3/2013 | Ishikawa et al. | 385/2 |

FOREIGN PATENT DOCUMENTS

| | | |
|---|---|---|
| JP | 9-297230 A | 11/1997 |
| JP | 10-10346 A | 1/1998 |
| JP | 2003-258368 A | 9/2003 |
| JP | 2006-301612 A | 11/2006 |
| JP | 2008-65104 A | 3/2008 |

OTHER PUBLICATIONS

Rolland, C., et al., "Optimization of Strongly Guiding Semiconductor Rib Waveguide Y-Junctions," IEEE Photonics Technology Letters, vol. 2, No. 6 (Jun. 1990), pp. 404-406.

* cited by examiner

OPTICAL WAVEGUIDE DEVICE

BACKGROUND OF THE INVENTION

1. Field of the Invention

The present invention relates to an optical waveguide device and more particularly, to an optical waveguide device such as an optical modulator or an optical switch in which a Mach-Zehnder type waveguide is formed on a substrate.

2. Description of Related Art

In the fields of optical communications and optical measurements, an optical intensity modulator or an optical switch having an optical waveguide in which a Mach-Zehnder type (MZ type) structure is formed on a substrate of lithium niobate (LN), semiconductor material, or the like has been widely used.

The optical modulator having the MZ type structure includes a modulation electrode disposed along an MZ type waveguide, changes the optical phase between branched waveguides (arms) of the MZ type waveguide with a voltage applied to the modulation electrode, and controls ON/OFF states of light on the basis of an interference phenomenon in an optical coupler on the output side.

An example of an MZ type structure of the optical coupler which has the simplest structure and which can be easily manufactured is an MZ type structure in which the optical coupler has a Y-branched structure. In the waveguide having the Y-branched structure, light is guided to an output waveguide when the phases of the light input to the optical coupler are the same in the arms, and light is radiated from the Y-branched structure when the phases are opposite to each other, whereby an ON/OFF operation is performed.

Here, when the thickness of the substrate formed of LN or semiconductor material is equal to or less than 15 times the wavelength of an optical wave propagating in the optical waveguide, for example, equal to or less than 20 µm, the thickness of the substrate is approximately equal to the size of the optical waveguide and light radiated from the Y-branched structure considers the substrate itself as a slab waveguide and propagates in the vicinity of the output waveguide. Accordingly, radiation-mode light which is OFF light is mixed into the output waveguide to cause a crosstalk phenomenon, thereby causing a problem in that the ON/OFF extinction ratio characteristic of the optical waveguide device degrades.

Figure 1:
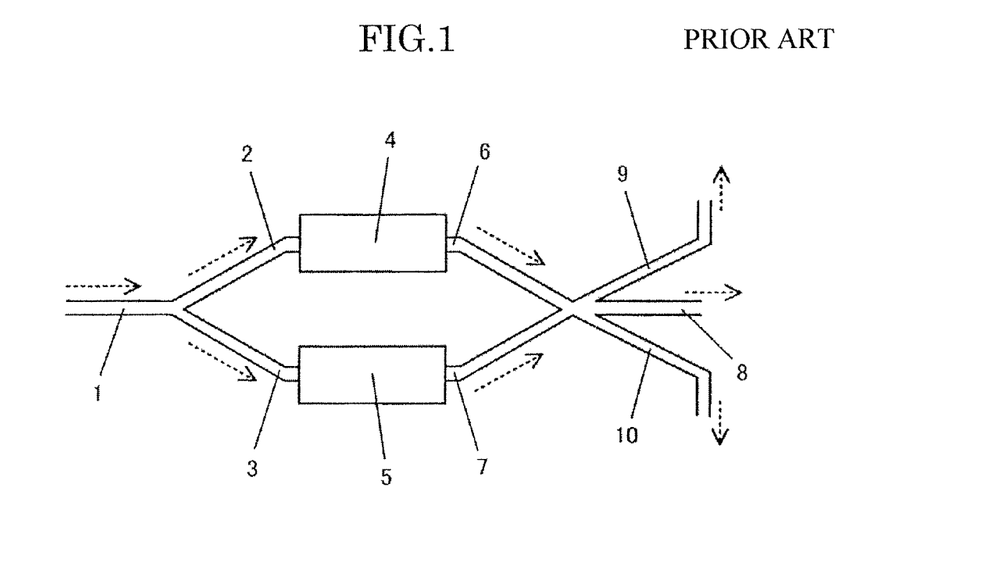
FIG. 1 is a diagram illustrating an example of an optical waveguide device according to the related art.

In order to solve this problem, U.S. Pat. No. 5,627,929 discloses a technique of preventing a substrate from becoming a slab waveguide and improving the characteristics of an optical waveguide device by using an XY coupler as an optical coupler of an MZ type waveguide, as shown in FIG. 1. In FIG. 1, the MZ type structure includes an input waveguide 1, branched waveguides 2(6) and 3(7), and an output waveguide 8. Modulators 4 and 5 are disposed in a part of the branched waveguides. In U.S. Pat. No. 5,627,929, waveguides 9 and 10 deriving radiation-mode light are disposed in the optical coupler. Here, the dotted arrow represents the propagation direction of an optical wave.

Figure 2:
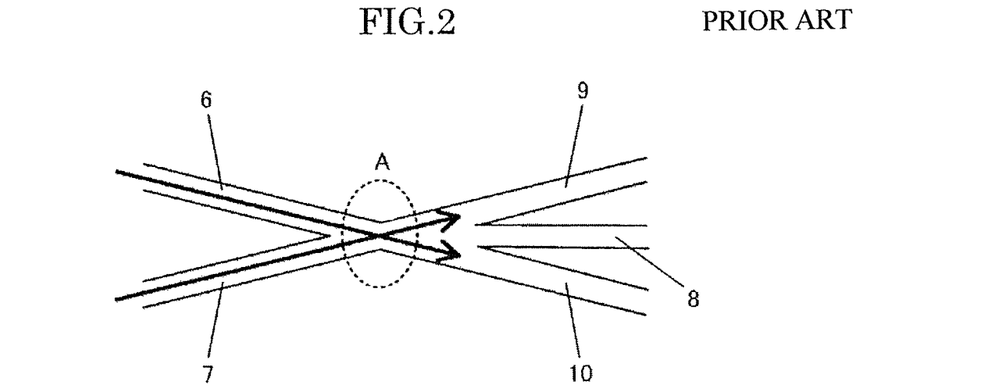
FIG. 2 is an enlarged view of an optical coupler shown in FIG. 1.

In the technique disclosed in U.S. Pat. No. 5,627,929, as shown in FIG. 2, the waveguides are intersected so that the waist (A) of the optical coupler is in a single mode. In such a structure, since the discontinuity in the intersected portion is great, input light in the optical coupler excites higher-mode light and thus light is fluctuated after the coupling of the light. As a result, the extinction ratio of the output degrades or the complementarity of the ON-light output and the OFF-light output collapses. Accordingly, for example, when the OFF-light component is used for the DC bias monitoring control of an MZ type modulator but an appropriate bias point is set using the OFF light (radiation-mode light), the ON-light output side is in an inappropriate bias state and there is a problem in that the output characteristics optimal for the modulator cannot be obtained.

SUMMARY OF THE INVENTION

The invention is made to solve the above-mentioned problems and an object thereof is to provide an optical waveguide device which can suppress excitation of unnecessary higher-mode light in an optical coupler of an MZ type waveguide, which can stabilize output light, and which can efficiently derive radiation-mode light.

According to a first aspect of the invention, there is provided an optical waveguide device having a Mach-Zehnder type waveguide formed on a substrate, wherein a slope of two waveguides input to an optical coupler on an output side of the Mach-Zehnder type waveguide is 0 degrees, a waveguide of the optical coupler after being coupled by the optical coupler is a multi-mode waveguide, and a waveguide which is output from the optical coupler is a three-branched waveguide including an output main waveguide and two output sub waveguides interposing the output main waveguide therebetween.

A second aspect of the invention provides the optical waveguide device according to the first aspect, wherein a thickness of the substrate is equal to or less than 15 times a wavelength of an optical wave propagating in the waveguide.

A third aspect of the invention provides the optical waveguide device according to the first or second aspect, wherein a width of the output sub waveguides of the output three-branched waveguide is smaller than a width of the output main waveguide.

A fourth aspect of the invention provides the optical waveguide device according to any one of the first to third aspects, wherein a plurality of the Mach-Zehnder type waveguides are formed on the same substrate and when at least one of the output sub waveguides output from the Mach-Zehnder type waveguides intersects another waveguide, the output sub waveguide is inclined with respect to the other waveguide at an angle of 3 degrees or more.

According to the first aspect, the optical waveguide device having a Mach-Zehnder type waveguide formed on a substrate, a slope of two waveguides input to an optical coupler on an output side of the Mach-Zehnder type waveguide is 0 degrees, a waveguide of the optical coupler after being coupled by the optical coupler is a multi-mode waveguide, and the waveguide which is output from the optical coupler is a three-branched waveguide including an output main waveguide and two output sub waveguides interposing the output main waveguide therebetween. Accordingly, it is possible to suppress generation of unnecessary higher-mode light in the optical coupler and to suppress the problem in that the higher-mode light enters the output main waveguide to fluctuate the output light. It is also possible to stably derive only the radiation-mode light by the use of the output sub waveguide.

According to the second aspect, since a thickness of the substrate is equal to or less than 15 times a wavelength of an optical wave propagating in the waveguide, the substrate serves as a slab waveguide and thus the optical wave radiated in the substrate propagates in the substrate and is easily re-coupled to the optical waveguide. By employing the configuration according to the first aspect for the substrate, it is possible to provide an optical waveguide device which can suppress radiation of the optical wave, particularly, higher-mode light, from the optical waveguide into the substrate and which has stable output characteristics.

According to the third aspect, since a width of the output sub waveguides of the output three-branched waveguide is smaller than a width of the output main waveguide, it is possible to guide single-mode light to the output main waveguide and to guide higher-mode light to the output sub waveguides, thereby efficiently separating both.

According to the fourth aspect, since a plurality of Mach-Zehnder type waveguides are formed on the same substrate and when at least one of the output sub waveguides output from the Mach-Zehnder type waveguides intersects another waveguide, the output sub waveguide is inclined with respect to the other waveguide at an angle of 3 degrees or more, it is possible to suppress the coupling of the higher-mode light propagating in the output sub waveguides to another waveguide and to stably derive the higher-mode light, thereby not destabilizing optical waves propagating in another waveguide.

DETAILED DESCRIPTION OF THE INVENTION

An optical waveguide device according to an embodiment of the invention will be described below in detail.

Figure 3:
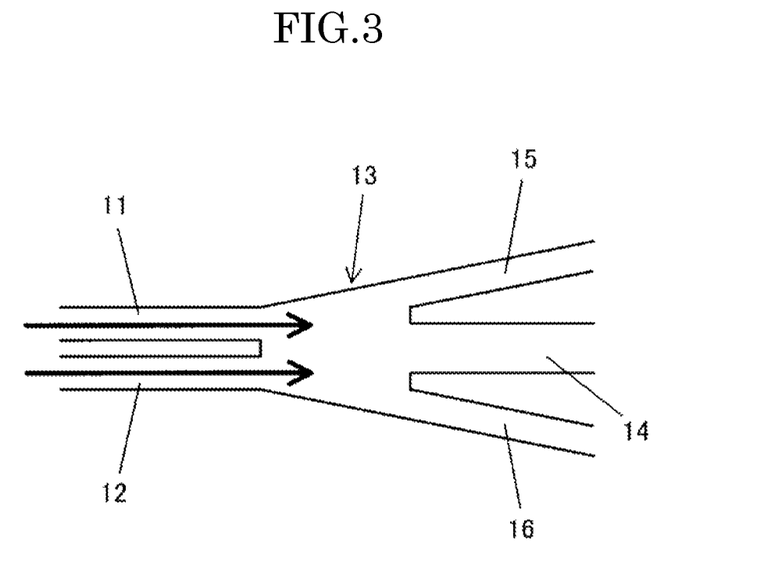
FIG. 3 is a diagram schematically illustrating the configuration of an optical coupler in an optical waveguide device according to an embodiment of the invention.

As shown in FIG. 3, an optical waveguide device according to an embodiment of the invention is an optical waveguide device having a Mach-Zehnder type waveguide formed on a substrate, in which a slope of two waveguides 11 and 12 input to an optical coupler 13 on an output side of the Mach-Zehnder type waveguide is 0 degrees, a waveguide of the optical coupler after being coupled by the optical coupler is a multi-mode waveguide, and the waveguide which is output from the optical coupler is a three-branched waveguide including an output main waveguide 14 and two output sub waveguides interposing the output main waveguide therebetween.

As shown in FIG. 3, it is possible to set the slopes of two waveguides input to the optical coupler 13 to 0 degrees by arranging the branched waveguides 11 and 12 to be parallel to each other, and it is possible to suppress generation of unnecessary higher-mode light in the optical coupler by forming the optical coupler as a multi-mode waveguide. As a result, it is possible to prevent a problem of higher-mode light entering the output main waveguide 14 to fluctuate the output light. It is also possible to stably derive only radiation-mode light by the use of the output sub waveguides 15 and 16.

In the invention, "a slope of two waveguides is 0 degrees" does not mean only perfect 0 degrees but includes such slight inclinations to achieve the advantages of the invention in view of convenient design.

A dielectric substrate or a substrate formed of a material having an electro-optical effect can be used as the substrate in the invention. For example, substrates formed of lithium niobate, lithium tantalate, PLZT (Lead Lanthanum Zirconate Titanate), and quartz-based materials, or combinations thereof can be used. Particularly, lithium niobate (LN) crystal having a high electro-optical effect can be suitably used.

An optical waveguide can be formed on the substrate by diffusing Ti or the like into the substrate surface through the use of a thermal diffusion method or a proton exchange method. A ridge-shaped waveguide may be used in which a part of the substrate corresponding to the optical waveguide is made to be convex by etching the part of the substrate other than the optical waveguide or forming grooves on both sides of the optical waveguide.

In the optical waveguide device such as an optical modulator, modulation electrodes such as a signal electrode or a ground electrode are formed on the substrate. Such electrodes can be formed through the use of formation of Ti and Au electrode patterns and gold plating. A dielectric buffer layer of $SiO_2$ or the like may be formed on the surface of the substrate on which the optical waveguide has been formed if necessary and the modulation electrodes may be formed on the buffer layer.

When the substrate decreases in thickness, the mechanical strength of the overall device is lowered and thus a reinforcing plate is bonded to the substrate. Various materials can be used for the reinforcing plate, and examples thereof include the same material as the thin substrate, materials such as quartz, glass, and alumina having lower dielectric constants than that of the thin substrate, and materials having a crystal orientation other than that of the thin substrate. Here, it is preferable that a material having the same linear expansion coefficient as the thin substrate, from the viewpoint of stabilization of modulation characteristics of the optical modulator with temperature variation. When it is difficult to select the material having the same linear expansion coefficient, a material having the same linear expansion coefficient as the thin substrate is selected as an adhesive bonding the reinforcing plate to the thin substrate.

Regarding the bonding of the reinforcing plate to the thin substrate, various adhesive materials such as an epoxy-based adhesive, a thermosetting adhesive, a UV-curable adhesive, a soldering glass, and thermosetting, photo-curable, or photo-thickening resin adhesive sheets can be used. The thin substrate and the reinforcing plate may be directly bonded to each other using a direct bonding method without using an adhesive.

By setting the thickness of the substrate used in the invention to be equal to or less than 15 times the wavelength of an optical wave propagating in the waveguide (for example, the thickness of the substrate is set to be equal to or less than about 20 μm when an optical wave having a wavelength of 1.55 μm is used), the substrate can easily function as a slab waveguide. Under this condition, the optical wave discharged into the substrate propagates in the substrate and is easily re-coupled to the optical waveguide. By causing the optical waveguide device employing this substrate to employ the configuration of the invention, it is possible to provide an optical waveguide device which can suppress the discharging of an optical wave, particularly, higher-mode light, into the substrate from the optical waveguide and which has stable output characteristics.

Examples of the optical waveguide device according to the invention will be described with reference to FIGS. 4A and 4B to FIGS. 6A and 6B.

Figure 4A:
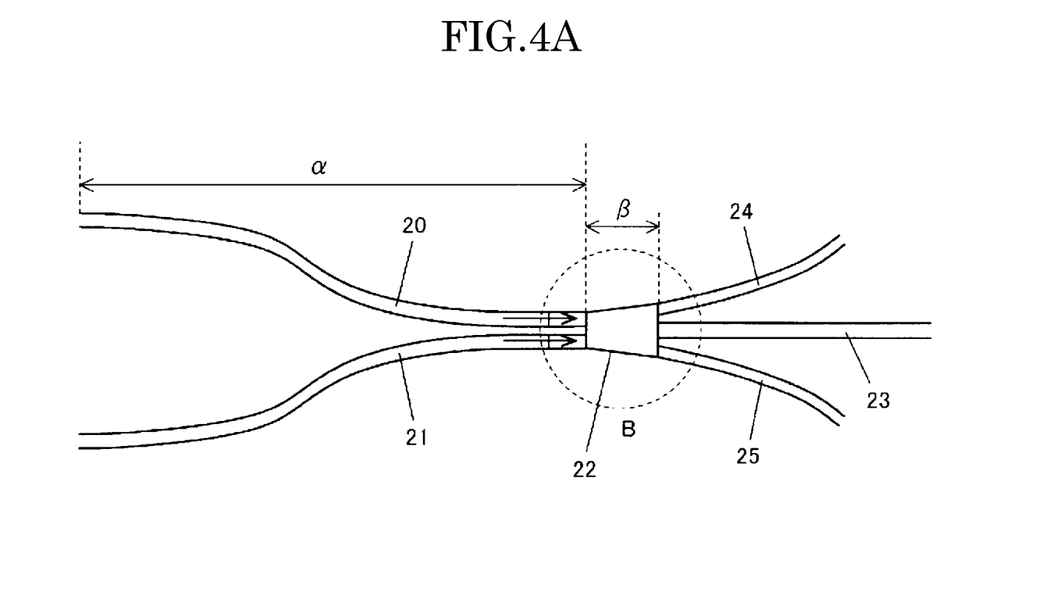
FIGS. 4A and 4B are diagrams illustrating a first example of the optical waveguide device according to the embodiment of the invention.
Figure 4B:
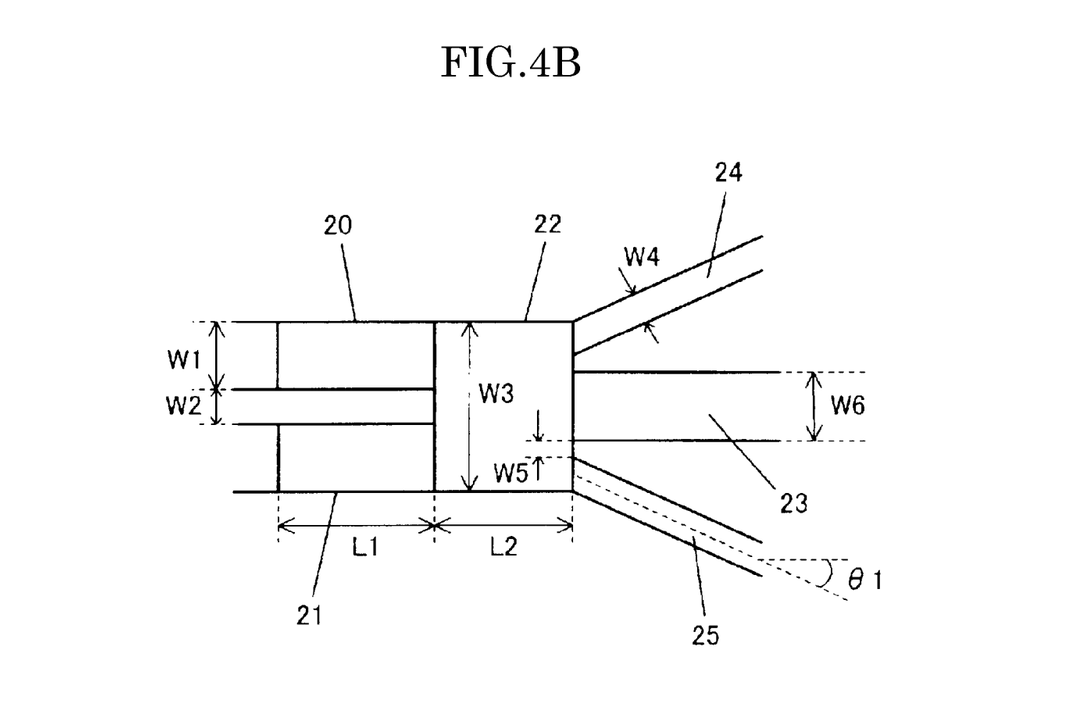

FIG. 4A shows the shape of a part including the optical coupler of the MZ type waveguide in the optical waveguide device and FIG. 4B schematically shows the part of the waveguide indicated by a dotted line B in FIG. 4A.

Two waveguides input to the optical coupler 22 shown in FIG. 4A include branched waveguides 20 and 21 of the MZ type waveguide. The waveguide in the section α includes a curved part (left part) and a linear part (a part corresponding to the length L1 in FIG. 4B) smoothly connected to the curved part as shown in FIG. 4A. The ends of the branched waveguides 20 and 21 are connected to the optical coupler 22 and the parts just prior to the connection have parallel linear parts of the length L1 so that the slope of the two waveguides is 0 degrees, as shown in FIG. 4B. Here, the slope of the parallel linear parts is preferably perfectly 0 degrees, but the slope with an error of 0.1 degrees or less can be permitted as a range in which the same advantages as the invention can be expected.

The length L1 of the parallel linear parts is a length enough to cause the traveling directions of the optical waves propagating in the branched waveguides to be parallel to each other. For example, the length is preferably set to 100 μm or more. Here, when the length L1 further increases, the crosstalk phenomenon of the optical waves propagating in the optical waveguides appears in the parallel waveguide parts and the optical waves may interfere with each other before reaching the optical coupler. Accordingly, the length L1 is preferably set to 500 μm or less.

When the thickness of the substrate is set to about 10 μm, the width W1 of the waveguide on the input side shown in FIG. 4B is in the range of 3 μm to 8 μm to form single-mode light. The width W6 of the waveguide 23 (the output main waveguide) on the output side is similarly set to the range of 3 μm to 8 μm to form single-mode light.

The gap W2 between the waveguides 20 and 21 on the input side is preferably as small as possible so that the optical waves propagating in the two waveguides are appropriately coupled and it is necessary to set the gap to 1 μm or less. On the other hand, when the gap W2 further decreases, the manufacturing reproducibility of the waveguide associated with the optical coupler is markedly lowered and thus the gap W2 is preferably set to 0.5 μm or more. In consideration thereof, the gap W2 is set to, for example, about 0.8 μm.

The width W3 of the optical coupler (section β) 22 is set to two times the width W1 of the input waveguide or more so as to form multi-mode light. The length L2 of the waveguide of the optical coupler is set to the range of 10 μm to 500 μm, whereby it is possible to embody a waveguide structure having good characteristics.

As the shape of the optical coupler, various shapes such as the trapezoidal shape shown in FIG. 4A and the rectangular shape shown in FIG. 4B can be employed. The shape of the optical coupler is set to be smoothly connected to the branched waveguides at the connection part on the input side of the optical coupler and to be smoothly connected to the output sub waveguides on the output side of the optical coupler.

The three-branched waveguide includes an output main waveguide 23 and output sub waveguides 24 and 25. The width W4 of the output sub waveguides is set to be smaller than the width W6 of the output main waveguide and is set to, for example, the range of 1 μm to 6 μm. Only higher-mode light is set to propagate in the output sub waveguides. The angle θ1 formed by the output sub waveguides and the output main waveguide is preferably set to an angle of 2 degrees or less so as to reduce the discontinuity of the three-branched waveguide. Similarly to the connection of the input-side waveguides, the slope of the input waveguides may be set to 0 degrees so as to be parallel to the output main waveguide. The shape of a function capable of setting only the part output from the optical coupler to 0 degrees, such as a sinusoidal function or a cubic function, may be employed.

The gap W5 between the output main waveguide 23 and the output sub waveguide 24 (25) is preferably as small as possible so as to appropriately separate single-mode light and multi-mode light, and needs to be set to 1 μm or less. On the other hand, when the gap W5 decreases, the manufacturing reproducibility of the waveguide associated with the optical coupler is markedly lowered and the gap W2 is preferably set to 0.5 μm or more. In consideration thereof, the gap W5 is set to, for example, 0.8 μm.

Figure 5A:
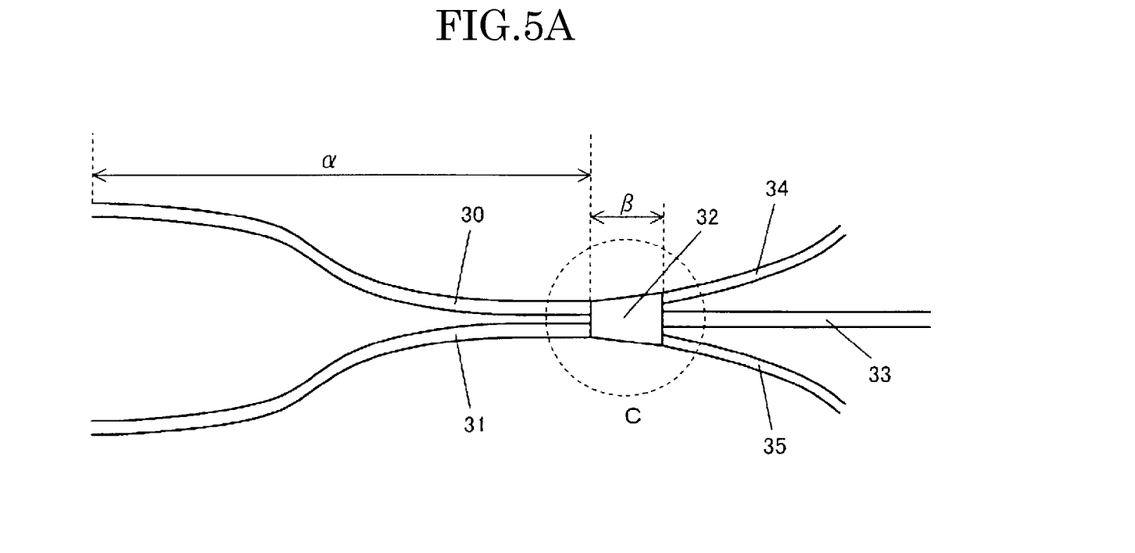
FIGS. 5A and 5B are diagrams illustrating a second example of the optical waveguide device according to the embodiment of the invention.
Figure 5B:
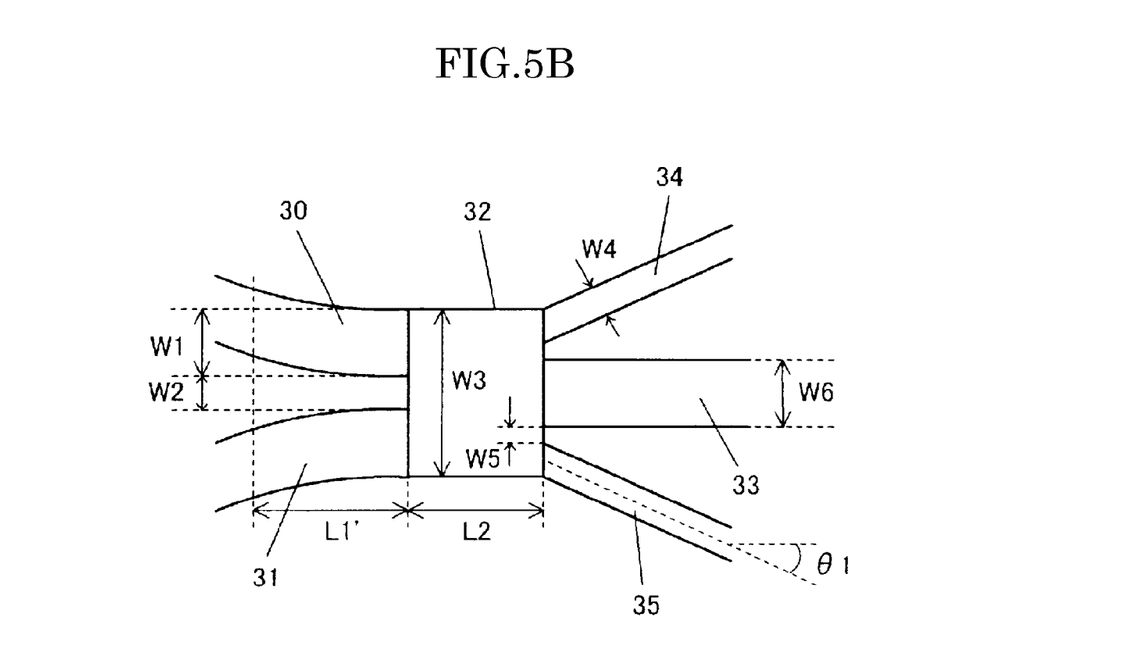

In FIGS. 5A and 5B, end portions of the input waveguides 30 and 31 input to the optical coupler 32 are set to the shape of a function such as a sinusoidal function or a cubic function capable of setting the slope in the connection to the optical coupler 32 to 0 degrees. The other configurations can be set to be similar to FIGS. 4A and 4B. FIG. 5B is an enlarged view of the part indicated by the dotted line C in FIG. 5A.

In the branched waveguides 30 and 31 just prior to connection to the optical coupler 32, the angle formed by the propagation direction of an optical wave (to the right side in FIG. 5B) and the branched waveguides varies continuously. Basically, the angle at the connection part of the branched waveguides and the optical coupler has only to be 0 degrees. However, when the angle varies rapidly, the optical waves propagating in the two waveguides may not be appropriately coupled in the optical coupler 32. Accordingly, it is preferable that a section in which the angle is equal to or less than 0.1 degrees be provided to the part (the part corresponding to the length L1') just prior to the optical coupler and the length L1' of the section be set to be equal to or more than 100 μm and equal to or less than 500 μm.

By setting the connection state of the input waveguides and the optical coupler to the shape shown in FIGS. 4A and 4B or FIGS. 5A and 5B, it is possible to suppress excitation of unnecessary higher-mode light and thus to improve the extinction ratio of the output or the complementarity of the optical outputs of ON light and OFF light.

Figure 6A:
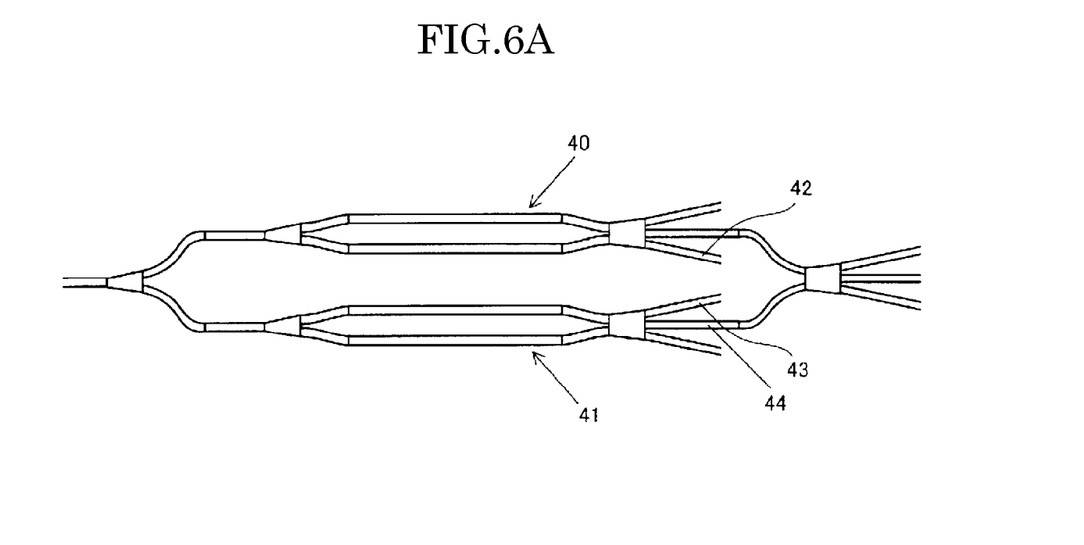
FIGS. 6A and 6B are diagrams illustrating an example where plural Mach-Zehnder type waveguides are disposed in the optical waveguide device according to the embodiment of the invention.
Figure 6B:
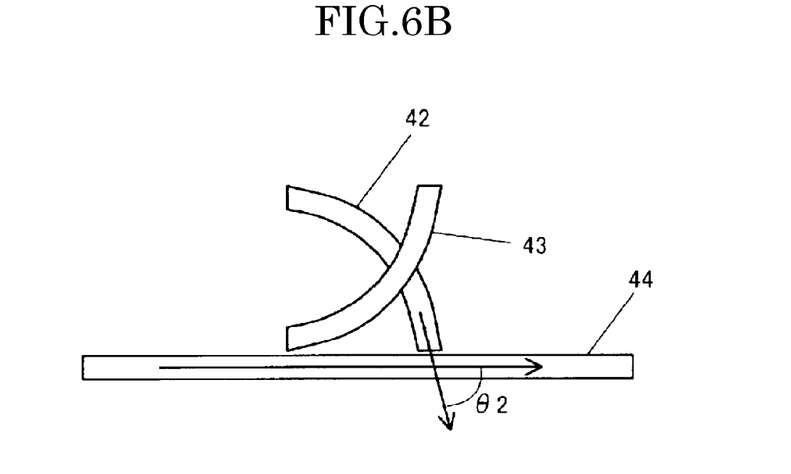

As shown in FIGS. 6A and 6B, an example where plural MZ type waveguides 40 and 41 are formed on the same substrate will be described below. In this case, an output sub waveguide may intersect another waveguide. For example, the output sub waveguide 42 shown in FIG. 6A intersects another output sub waveguide 43 or an output main waveguide 44, as shown in FIG. 6B.

When plural optical waveguides intersect each other in this way, a crosstalk phenomenon that an optical wave propagating in one waveguide migrates to the other waveguide can easily occur. In the invention, in order to prevent such a crosstalk phenomenon, the angle θ2 at which the optical waveguides intersect each other is set to a slope of 3 degrees or more. Particularly, since higher-mode light tends to be coupled to another optical waveguide, it is preferable that the intersection angle of the output sub waveguides in which higher-mode light propagates be necessarily set to 3 degrees or more.

As described above, according to the invention, it is possible to provide an optical waveguide device which can suppress excitation of unnecessary higher-mode light in an optical coupler of an MZ type waveguide, which can stabilize output light, and which can efficiently derive radiation-mode light.

What is claimed is:

1. An optical waveguide device comprising a Mach-Zehnder type waveguide formed on a substrate,
   wherein two waveguides input to an optical coupler on an output side of the Mach-Zehnder type waveguide have parallel linear parts arranged parallel to each other, a length of the parallel linear parts is not less than 100 μm and not more than 500 μm, and a gap between the parallel linear parts is not less than 0.5 μm and not more than 1 μm,
   wherein a waveguide of the optical coupler after being coupled by the optical coupler is a multi-mode waveguide, and
   wherein a waveguide which is output from the optical coupler is a three-branched waveguide including an output main waveguide and two output sub waveguides interposing the output main waveguide therebetween.

2. The optical waveguide device according to claim 1, wherein a thickness of the substrate is equal to or less than 15 times a wavelength of an optical wave propagating in the Mach-Zehnder type waveguide.

3. The optical waveguide device according to claim 2, wherein a width of the output sub waveguides of the output three-branched waveguide is smaller than a width of the output main waveguide.

4. The optical waveguide device according to claim 2,
   wherein a plurality of the Mach-Zehnder type waveguides are formed on the same substrate,
   wherein a first one of the output sub waveguides output from the Mach-Zehnder type waveguides intersects a second one of the output sub waveguides output from the Mach-Zehnder type waveguides and/or one of the output main waveguides output from the Mach-Zehnder type waveguides, and another waveguide,
   the first one of the output sub waveguides is inclined with respect to the intersected waveguide at an angle of 3 degrees or more.

5. The optical waveguide device according to claim 1, wherein a width of the output sub waveguides of the output three-branched waveguide is smaller than a width of the output main waveguide.

6. The optical waveguide device according to claim 5,
   wherein a plurality of the Mach-Zehnder type waveguides are formed on the same substrate,
   wherein a first one of the output sub waveguides output from the Mach-Zehnder type waveguides intersects a second one of the output sub waveguides output from the Mach-Zehnder type waveguides and/or one of the output main waveguides output from the Mach-Zehnder type waveguides, and
   the first one of the output sub waveguides is inclined with respect to the intersected waveguide at an angle of 3 degrees or more.

7. The optical waveguide device according to claim 1,
   wherein a plurality of the Mach-Zehnder type waveguides are formed on the same substrate,
   wherein a first one of the output sub waveguides output from the Mach-Zehnder type waveguides intersects a second one of the output sub waveguides output from the Mach-Zehnder type waveguides and/or one of the output main waveguides output from the Mach-Zehnder type waveguides, and
   the first one of the output sub waveguides is inclined with respect to the intersected waveguide at an angle of 3 degrees or more.

* * * * *